J. A. THOMPSON.
TRACTOR DRIVING MECHANISM.
APPLICATION FILED JAN. 8, 1919.
1,393,409.
Patented Oct. 11, 1921.
2 SHEETS—SHEET 2.
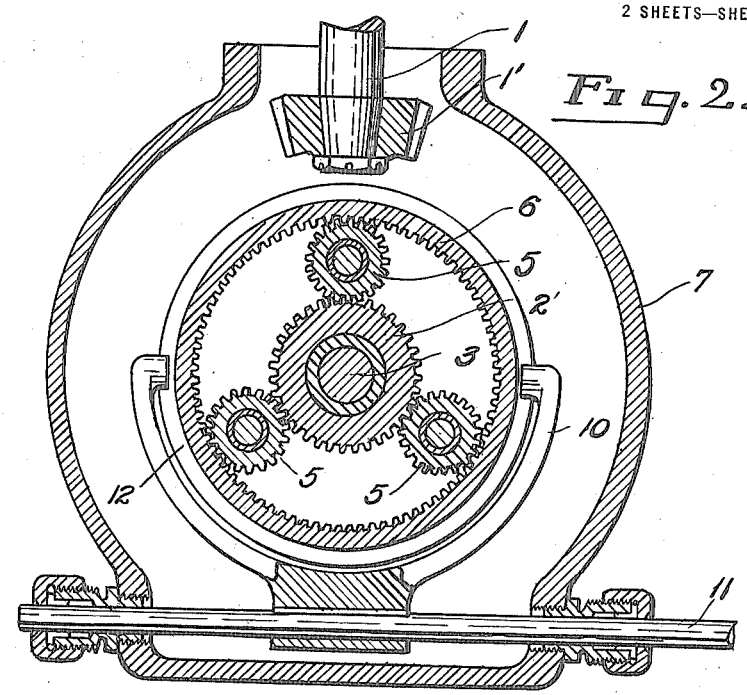
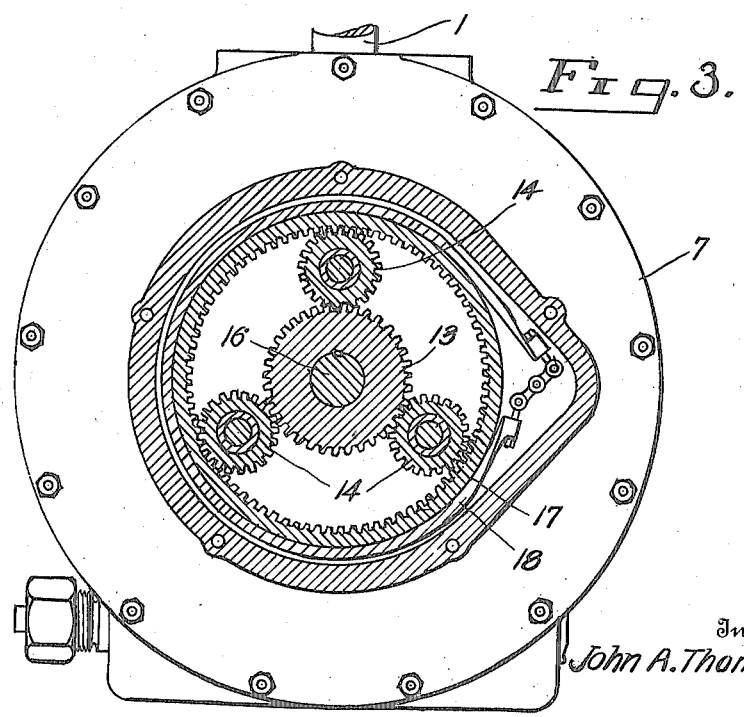
Inventor
John A. Thompson
By Reynolds Cook
Attorneys

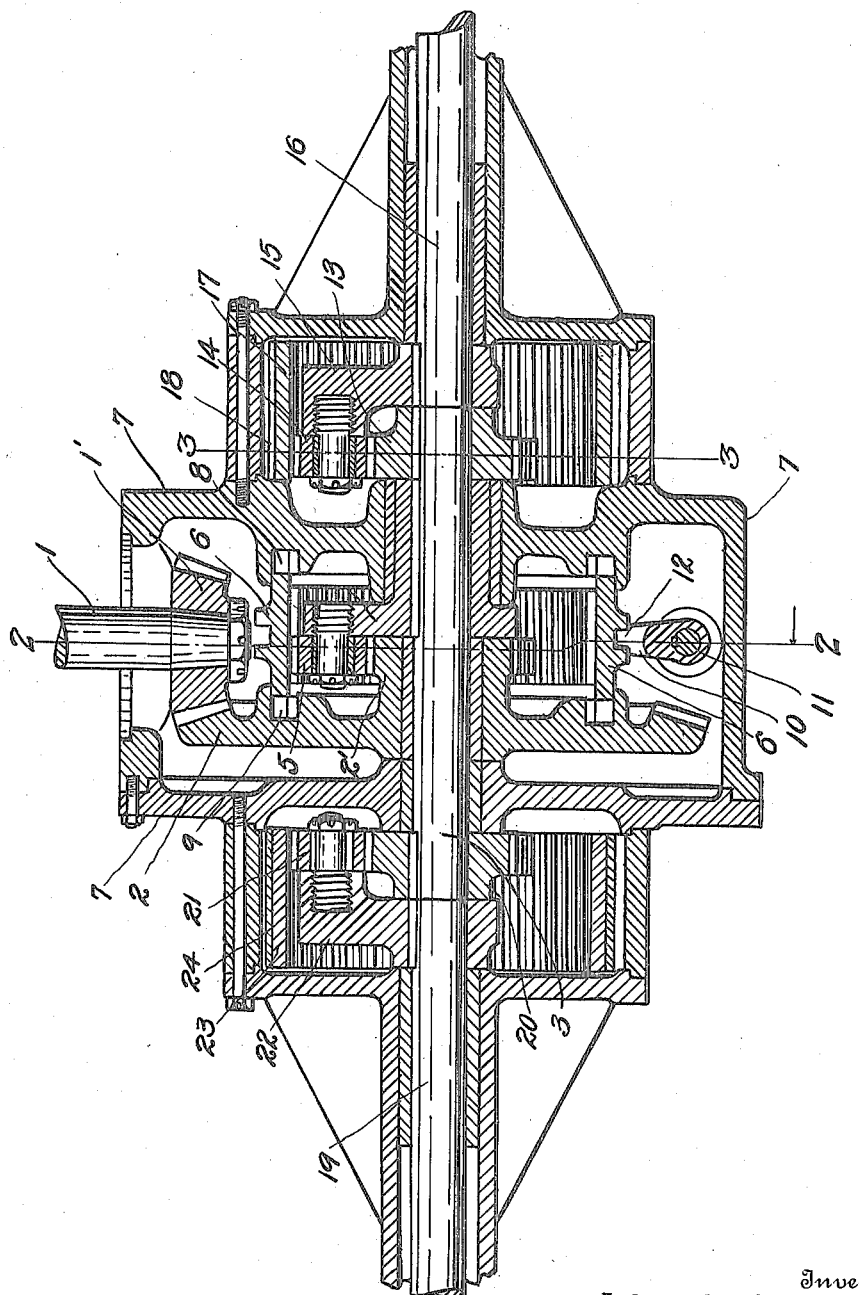

UNITED STATES PATENT OFFICE.

JOHN A. THOMPSON, OF SEDRO WOOLLEY, WASHINGTON, ASSIGNOR TO PERFECTO GEAR DIFFERENTIAL CO., OF SEATTLE, WASHINGTON, A CORPORATION OF WASHINGTON.

TRACTOR DRIVING MECHANISM.

1,393,409.     Specification of Letters Patent.     Patented Oct. 11, 1921.

Application filed January 8, 1919. Serial No. 270,165.

*To all whom it may concern:*

Be it known that I, JOHN A. THOMPSON, a citizen of the United States, and resident of Sedro Woolley, Skagit county, Washington, have invented certain new and useful Improvements in Tractor Driving Mechanisms, of which the following is a specification.

This invention relates to new and useful improvements in driving mechanism for tractors and the object of this improvement is to provide a driving mechanism that has two driving positions, whereby the axles that rotate the tractor wheels may be driven at a high or at a low rate of speed, and a neutral position, whereby the driving mechanism may be rendered inoperative.

Another object is to simplify the construction of driving gears and to render more efficient transmission of power through a gear reduction by reducing friction in the gear transmission mechanism and eliminating excessive strain on the engine.

A still further object is to provide a gear reduction, capable of driving the tractor wheels at a high or low rate of speed, collectively or independently.

The invention comprises the novel construction and arrangement of parts as will be more fully described in the specification, illustrated in the accompanying drawings, and finally pointed out in the appended claims.

In the drawings, Figure 1 is a section, in plan, of the driving mechanism.

Fig. 2 is a section taken along line 2—2 of Fig. 1.

Fig. 3 is a section taken along line 3—3 of Fig. 1.

Referring more particularly to the drawings, in which like reference numerals indicate like parts, the numeral 1 represents the drive shaft of an engine, having a bevel gear 1' provided on the end thereof that meshes with a gear 2, rotatably mounted upon suitable bearings disposed around the intermediate axle 3, and keyed to the intermediate axle 3 alongside of the gear 2, is a disk 4 that has rotatably mounted on one side thereof in spaced relation a plurality of intermediate gears 5, that mesh, respectively with a gear 2' provided on a hub or collar extension of the gear 2, and with an internally geared ring 6 provided concentrically with the axle 3.

A housing 7 is herein provided for the gears and disposed on the inner side of the housing in spaced relation, are slots 8 for the reception of lugs provided oppositely on the ring gear 6. Similarly arranged slots 9 are provided on this side of the gear 2 for the reception of correspondingly shaped lugs on the opposite side of the ring gear, whereby, through the provision of the bifurcated ends 10 of a lever 11, that engages a channelway 12 on the outer periphery of the ring gear, the said ring gear can be shifted from the neutral position as shown to engage the gear 2 and lock the transmission, whereupon the intermediate axle 3 will be rotated at the speed of the gear 2; or the ring gear 6 can be shifted to engage the housing 7 and transmit increased power at a lower rate of speed through the intermediate gears to the axle 3.

Disposed in abutment with the shoulder of the disk 4 is a pinion 13 that is keyed to the intermediate axle 3, which meshes with a plurality of rotatably mounted intermediate gears 14, placed in spaced relation on the side of the disk 15, keyed to the axle 16, and internally with the ring gear 17, and this ring gear can be held against rotary movement by the provision of a friction band 18, disposed therearound, which is adapted to engage its outer periphery when pressure is applied thereto, as is more clearly shown in Fig. 3.

It is obvious that, when pressure is applied to the friction band, the ring gear is caused to be arrested from rotation and the intermediate gears 14 are actuated to travel around the inner periphery thereof transmitting power at a further reduction to the axle 16.

The axle 19 is actuated through a gear reducing mechanism, the complement of the gear reducing mechanism that actuates the axle 16, a pinion 20 being keyed to the opposite end of the intermediate axle 3, which meshes with a plurality of intermediate gears 21 rotatably mounted in spaced relation on the disk 22, keyed to the axle 19, and internally with a ring gear 23 disposed therearound, which is adapted to be engaged by a friction band 24, and arrested from rotation when pressure is exerted by the band upon the outer periphery of the ring gear.

It is obvious that the tractor wheels that are carried by the axles 16 and 19 can be actuated collectively by applying the friction bands to arrest the rotation of the respective ring gears, 17 or 23, or one of the ring gears can be actuated as described and the other gear rendered inoperative by releasing the friction band, permitting the ring gear that controls the transmission of power to the axle on which it is disposed to rotate freely.

Having thus described my invention, what I claim as new and desire to protect by Letters Patent is:

1. A transmission of the class described comprising a three-part axle, a fixedly and a rotatably mounted disk on the intermediate part of said axle, said rotatably mounted disk having clutch recesses formed between the geared outer and shouldered inner part thereof, pinion gears mounted for rotation on said fixedly mounted disk disposed to mesh with the gear on the shoulder of said rotatably mounted disk, a ring gear in mesh with said pinion gears, means for driving said rotatably mounted disk, a fixed axle housing, clutch recesses formed in the periphery of said housing, clutch elements on both sides of said ring gear, means for shifting said ring gear to selectively lock the same to said rotatably mounted disk or to said axle housing, gear reducing mechanism provided respectively on the outer parts of said axle in engagement with said intermediate part, and means provided respectively for controlling the movement of the reducing mechanisms on the outer parts of said axle whereby said outer parts can be rendered operative or inoperative collectively or independently.

2. A transmission of the class described comprising a three-part axle, a fixedly and a rotatably mounted disk on the intermediate part of said axle, said rotatably mounted disk having clutch recesses formed between the geared outer and shouldered inner part thereof, pinion gears mounted for rotation on said fixedly mounted disk disposed to mesh with the gear on the shoulder of said rotatably mounted disk, a ring gear in mesh with said pinion gears, means for driving said rotatably mounted disk, a fixed axle housing, clutch recesses formed in the periphery of said housing, clutch elements on both sides of said ring gear, means for selectively locking said ring gear to said rotatably mounted disk or to said axle housing, pinions fixedly attached respectively on the outer ends of the intermediate part of said axle in engagement with rotatably mounted pinions carried respectively by the outer parts of said axle, ring gears in mesh respectively with said rotatably mounted pinions, and a friction band adapted to be actuated for controlling the movement of said ring gears whereby the outer parts of said axle can be rendered operative or inoperative collectively or independently.

3. A transmission of the class described comprising a three-part axle, a fixed axle housing having clutch recesses formed on the inner periphery thereof, a fixedly and a rotatably mounted disk on the intermediate part of said axle, said rotatably mounted disk having clutch recesses formed between the geared outer and shouldered inner part thereof, pinion gears mounted for rotation on said fixedly mounted disk disposed to mesh with the gears on the shoulder of said rotatably mounted disk, a ring gear in mesh with said pinion gears, said ring gear having clutch elements on the sides thereof, a shifting fork engageable with said ring gear, means for shifting said ring gear to be selectively locked to said disk or to said axle housing, pinions fixedly disposed on the outer ends of said intermediate part in mesh with intermediate pinions carried by the outer parts of said axle, ring gears surrounding said last named intermediate pinions, and friction bands adapted to engage said ring gears and render operative or inoperative the outer parts of said axle collectively or independently.

Signed at Seattle, Washington, this 28th day of December, 1918.

JOHN A. THOMPSON.